United States Patent [19]

Suzuki et al.

[11] Patent Number: 5,069,275
[45] Date of Patent: Dec. 3, 1991

[54] HEAT EXCHANGER

[75] Inventors: Katsuhisa Suzuki, Utsunomiyashi; Toshinori Tokutake, Oyamashi, both of Japan

[73] Assignee: Showa Aluminum Kabushiki Kaisha, Osaka, Japan

[21] Appl. No.: 647,289

[22] Filed: Jan. 28, 1991

[30] Foreign Application Priority Data

Feb. 1, 1990 [JP] Japan ................................. 2-23034

[51] Int. Cl.$^5$ ............................................. F28F 9/00
[52] U.S. Cl. ..................................... 165/67; 165/149; 180/68.4; 248/233
[58] Field of Search ................. 165/67, 149; 180/68.4; 248/232, 233

[56] References Cited

U.S. PATENT DOCUMENTS

| 1,737,057 | 11/1929 | Muir | 180/68.4 |
| 1,886,330 | 11/1932 | Evans | 248/233 |

FOREIGN PATENT DOCUMENTS

| 1808787 | 8/1969 | Fed. Rep. of Germany | 248/232 |
| 2212771 | 9/1972 | Fed. Rep. of Germany | 248/232 |
| 2527325 | 11/1983 | France | 165/149 |
| 58-36723 | 3/1983 | Japan | 180/68.4 |
| 60-103298 | 6/1985 | Japan | 165/149 |
| 64-38481 | 3/1989 | Japan . | |

Primary Examiner—Allen J. Flanigan

[57] ABSTRACT

A heat exchanger includes a heat exchanger body and fasteners used to mount the body on an automobile or the like. The heat exchanger body comprises flat tubes and fin members alternatingly stacked on each other and a pair of hollow headers, with the ends of each tube being connected in fluid communication with the headers. Each fastener comprises a contacting concave portion with a shape which allows it to fit on an outer peripheral surface of a header, a hooking portion protruding from an end of the concave portion, and a fastening portion extending outwardly from another end of the concave portion. The concave portion is placed in close contact with the peripheral surface of the header, with a hook end of the hooking portion being inserted in between two adjacent tubes. The fasteners are soldered to the heat exchanger body and become integral with it.

7 Claims, 3 Drawing Sheets

HEAT EXCHANGER

BACKGROUND OF THE INVENTION

1. Field of the Invention

The invention relates to a heat exchanger of the so-called header type adapted for use as a condenser in the car coolers or the like.

2. Description of Prior Art

Serpentine type heat exchangers have been used as the condensers in automobile air conditioners or the like. The serpentine type heat exchangers comprise a flat extruded tube called "harmonica tube" which is perforated longitudinally, and repeatedly bent to assume a serpentine shape as a whole. Fin members are each interposed between two adjacent portions of the flat extruded tube and disposed parallel to each other. A header type heat exchanger has also been employed in place of the serpentine type heat exchanger. In the header type heat exchangers a plurality of flat depressed tubes and corrugated fin members are stacked one on another or side by side in an alternating manner. Respective ends of each tube are connected to cylindrical hollow headers. To mount the header type heat exchanger on the automobile body or the like, pieces of channel metal, which is U-shaped in cross section have been employed as disclosed in Japanese Utility Model Kokai No. 64-38481. A pair of the channel pieces are fitted on the header so that their facing portions are fastened to each other for instance by means of bolts or the likes. One of the paired channel pieces has a lug adapted to be secured to the automobile body. It is noted that such fastening members have necessitated intricate operations which cause a reduced labor efficiency in mounting the heat exchangers, in addition to the problem of increased weight of the heat exchanger inclusive of the fastening members. It has been proposed to use, in place of the prior art fasteners, a certain type of improved fastener which is arc-shaped at its one end and comprises at its other end a setting portion secured to the automobile body. The arc-shaped end may be fitted on the periphery of a header so as to be attached thereto by a welding or soldering process. However, the positioning of such proposed fasteners is not necessarily easy but requires tools to temporarily hold them in place while they are welded or soldered. It is also possible that the welding might cause coolant leakage at places where the headers are soldered to the tubes. In cases where the proposed fasteners are soldered within an oven together with the headers and tubes in one operation, the tools for temporarily setting the fasteners will absorb heat resulting in imperfect soldering.

SUMMARY OF THE INVENTION

An object of the invention, which was made to resolve the abovementioned problems is to provide a heat exchanger comprising fasteners to be attached to a heat exchanger body. The fasteners are capable of being positioned easily and precisely relative to the heat exchanger body and into their self-setting state without the use of auxiliary setting members.

To achieve the object, the fasteners each comprise a contacting concave portion with a shape fitting on outer peripheral surface of a header of a heat exchanger body, an L-shaped hooking portion protruding from an end of the concave portion and having amend bent away from the remaining hooking portion, and a fastening portion extending outwardly from another end of the concave portion, wherein the contacting concave portion is placed in close contact with the peripheral surface of a header, with the end of the hooking portion inserted in between two adjacent tubes so that the fasteners are soldered to the heat exchanger body to become integral therewith. To attach the fasteners to the heat exchanger body, the concave portion of each fastener is brought into close contact with the periphery of the header, and the hook of the hooking portion is inserted into a gap between the adjacent tubes. In this temporary assembly, the hooking portion serves to precisely position the fastener relative to the heat exchanger body, and at the same time cooperates with the concave portion to securely hold the fastener on the heat exchanger body. Thus, such a self-setting state takes place spontaneously without employing any temporary setting means.

It will now be apparent that the fastener of the invention is soldered to be integral with the heat exchanger body wherein the concave portion rests on the periphery of a header, with the end of the hooking portion being inserted in the gap between the tubes. Therefore, the fasteners can be positioned and attached easily and precisely to the heat exchanger body, relying on particular tubes' ordinal numbers counted for example from the uppermost tube. In other words, the structure of the invention makes it possible to utilize as markings the accurate and regular arrangement of tubes in order to dispose the end of the hooking portion at its correct position. Further, the L-shaped hooking portion and the contacting concave portion are so effective in holding the fastener in position that temporary securing members need not be employed. Owing to this feature, the operation for attaching the fasteners to the heat exchangers body becomes easier. In addition, the fasteners in the invention do not need any auxiliary parts such as screws or rivets which have been used with the prior art fasteners, e.g., "embracing brackets". Consequently, the present invention minimizes the number of parts to facilitate assembly, thereby reducing the production cost of the heat exchangers. It is thus possible to manufacture the heat exchanger with a higher efficiency and at a lower cost and to make it lighter in weight. Moreover, the present invention eliminates the possibility that the welding of the abovementioned proposed fastener to the heat exchangers body would cause coolant leakage at places where the headers are soldered to the tubes in a heat exchanger body previously manufactured by the soldering method. Also eliminated is the problem that, in a case wherein the proposed fasteners are soldered in one operation within the oven together with the headers and tubes, the tools for temporarily setting the fasteners would absorb heat and introduce imperfections in the soldering.

Other objects and advantages of the invention will become apparent from the following description of the preferred embodiments.

THE PREFERRED EMBODIMENTS

Figures 1, 2:
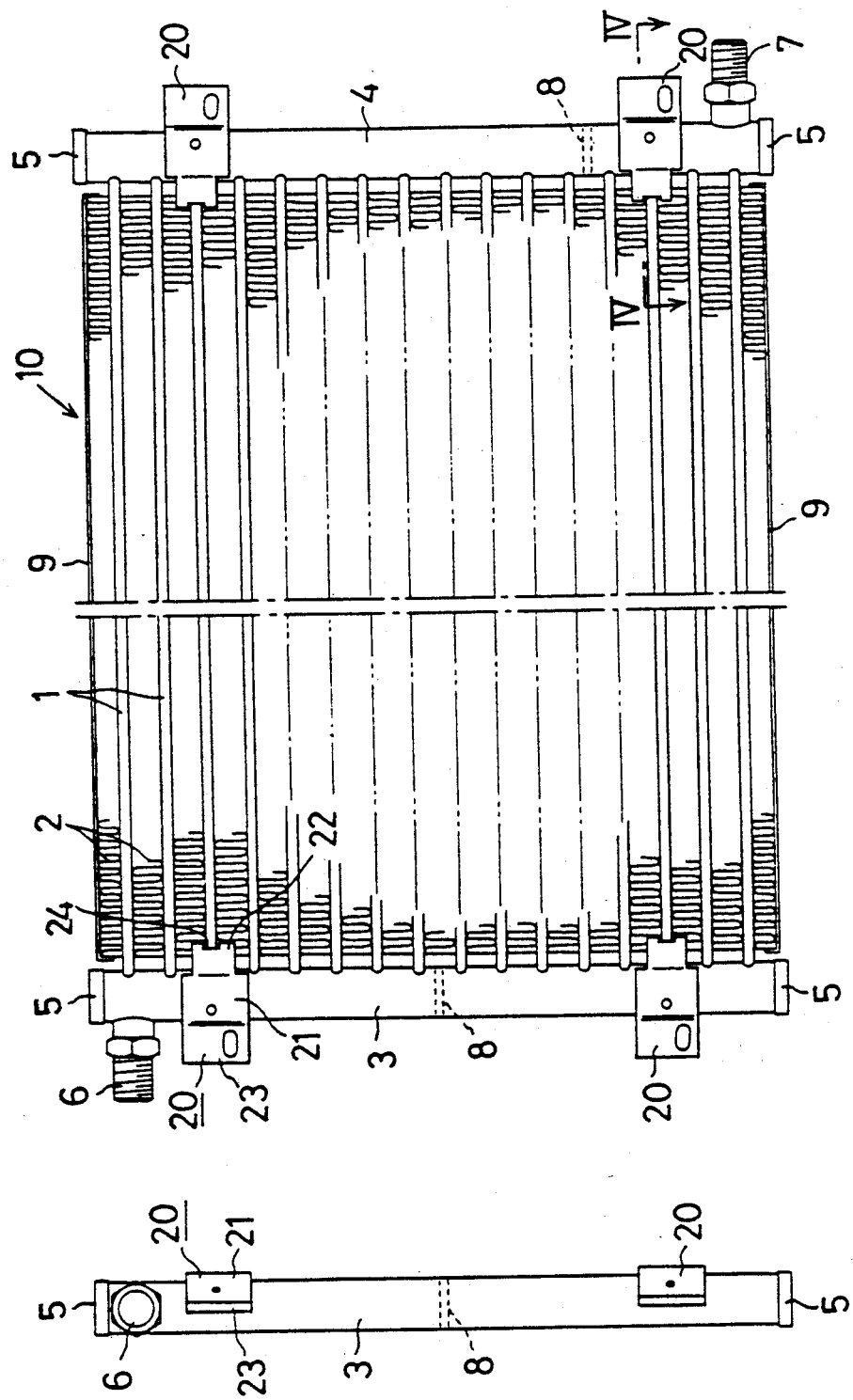
FIG. 1 is a front elevation view of the heat exchanger of the invention.
FIG. 2 is a left side elevation view of the heat exchanger.

The invention will now be described in detail referring to its embodiments applied to a heat exchanger made of aluminum and adapted for use as a condenser.

The term "aluminum" in this specification is meant to include its alloys.

In FIGS. 1 to 4, the reference numeral 1 denotes aluminum tubes which are in their horizontal position and stacked one above another. The reference numeral 2 denotes aluminum corrugated fin members, each of them being interposed between two adjacent tubes 1 and 1.

The tubes 1 are, for example, flat perforated tubes made by an extrusion method. Alternatively, they may be seam-welded flat tubes in which inner fins are inserted and secured.

The corrugated fin members 2 are of the same width as the tubes 1, and are soldered to the tubes to be integral them. To facilitate the soldering of the fin members to the tubes, fin members which are made of a brazing sheet consisting of a core material having one or both sides covered with soldering agent layers are preferred.

The reference numerals 3 and 4 denote left and right hollow headers, respectively, which are circular in their cross sections. Ends of each tube 1 are connected to these headers so as to be in fluid communication with them. To facilitate the soldering of the tubes to the headers, headers 3 and 4 made of the brazing sheet consisting of core material having one or both sides covered with soldering agent layers are preferred. In such a case, the brazing sheet is bent at first to form a cylinder with a longitudinal slit, and then longitudinal abutting edges of the slit are soldered to each other to form a hollow aluminum pipe.

Top and bottom ends of each header 3 and 4 are closed with aluminum caps 5.

As shown in FIG. 1, a coolant inlet pipe 6 is connected to an upper outer portion of the left header 3, and a coolant outlet pipe 7 is connected to a lower outer portion of the right header 4. A partition 8 is fixed in the left header 3 at its central portion intermediate the top and bottom whereby the inside of the header 3 is divided into upper and lower spaces. Another partition 8 is secured in the right header 4 somewhat below its center between the top and bottom. Coolant which flows through the inlet pipe 6 into the left header 3 will flow through all the coolant paths within the tubes which are arranged to form a serpentine passage as a whole. Air streams passing through air paths which are formed through the corrugated fin members 2 will effect heat exchange between the coolant and them so that the coolant is condensed before leaving the heat exchanger through the outlet pipe 7. The reference numeral 9 denotes top and bottom side plates which are disposed outside the outermost corrugated fin members 2.

A heat exchanger body 10 constructed as outlined above will be mounted on an automobile body or the like by means of four fasteners 20 which are located respectively at left upper and lower portions as well as at right upper and lower portions of the heat exchanger body 10.

Figure 3:
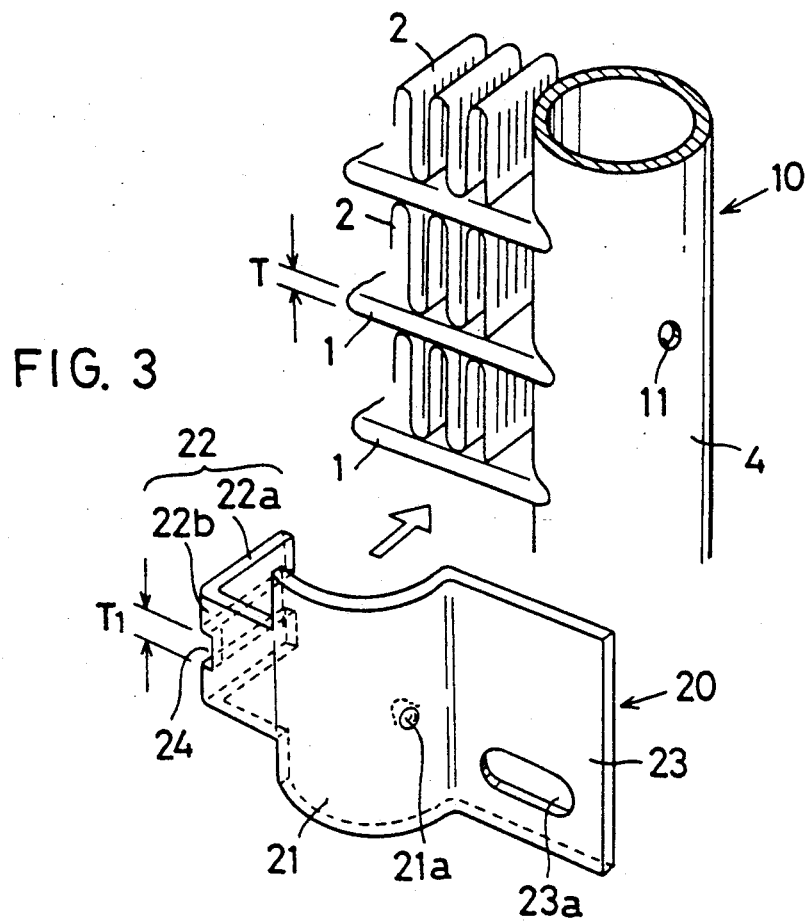
FIG. 3 is a perspective view showing a disassembled heat exchanger body and a fastener.

The fasteners 20 are each manufactured by bending a band of aluminum sheet, as shown in FIG. 3. A middle portion of the band is curved to fit on the outer peripheral surface of the headers 3 and 4. One end of the band is bent into an L-shape. Thus, each of the fasteners comprises a contacting concave portion 21 capable of fitting on the outer peripheral surface of the headers 3 and 4, a hooking portion 22 having an L-shaped cross section and protruding from an end of the concave portion 21, and a fastening portion 23 protruding from another end of the concave portion 21 so as to extend in a radial direction thereof. The hooking portion 22 has at its extremity a bent-up hook end 22a which is connected to the concave portion 21 by an extension 22b and comprises a cutout 24 adapted to engage a tube. The cutout extends inwardly of a tip end of the hook end 22a and lies along the center of the hook end. The width $T_1$ of cutout 24 is preferably the same as or larger than the thickness "T" of tubes by 1 mm or less so that the cutout 24 can grip the tube tightly and avoid a loose-jointed connection. The contacting concave portion 21 has an inwardly protruding lug 21a at a position corresponding to a locking aperture 11 formed in a peripheral wall of each header 3 and 4. A bolt-inserting hole 23a is perforated through the fastening portion 23. Before the fasteners 20 are soldered to the heat exchanger body 10, the contacting concave portions 21 are is placed in close contact with the peripheral surface of the headers 3 and 4, with the inwardly protruding lug 21a extending into the locking aperture 11, and the cutout 24 of bent-up hook end 22a gripping the tube 1. The hooking portion 22 is thus inserted in between two adjacent tubes 1, and the fasteners are soldered to the heat exchanger body 10 and become integral with it. It is desirable to conduct the soldering of fasteners in the so-called "in-one-operation" or "blanket" manner together with other parts of the heat exchanger body 10. In order to facilitate such "blanket" soldering, the headers 3, 4 and the corrugated fin members 2 are generally made of material covered with soldering agent layers. It is to be noted that in the temporary assembly including the fasteners before the soldering, the fasteners 20 maintain their "self-setting" state relative to the heat exchanger body 10.

Figure 4:
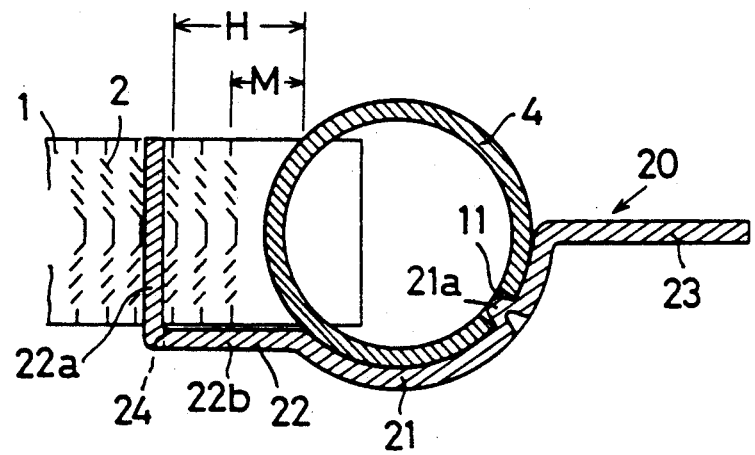
FIG. 4 is an enlarged cross sectional view taken along the line IV—IV in FIG. 1.

In general, a minimum clearance "M" is to be kept between the edges of fin member 2 and each header 3, 4 (as shown in FIG. 4) during the "blanket" soldering of the heat exchanger body 10 within are oven. If the distance between the edges and the header is less than the minimum clearance "M", then a considerable amount of the soldering agent will flow away from the soldering points towards the fin members, thereby impairing the soldering of tubes 1 to the headers 3 and 4. Likewise, the bent-up hook end 22a of each fastener 20 must be kept spaced apart from the headers 3 and 4 by at least the distance "H" which is equal to the minimum clearance "M" plus the fin pitch as shown in FIG. 4.

Figure 5:
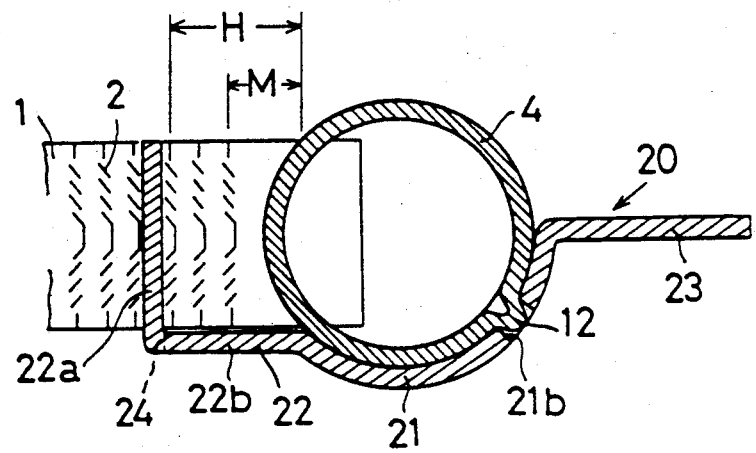
FIG. 5 is a cross sectional view which shows a modified fastener corresponding to the fastener of FIG. 4.

As described above, the locking aperture 11 is formed through the wall of header 4 and correspondingly the inwardly protruding lug 21a protrudes from the concave portion 21 of fastener 20 so that the concave portion of fastener can be exactly placed on said header 4 in the embodiment described above. However, it will be understood that it is also possible to form the wall of header 4 with an outwardly protruding lug 12 and correspondingly to form a corresponding locking aperture 21b through the concave portion 21 of the fastener 20, for the same purpose, as in a modified fastener 20 illustrated in FIG. 5.

Figure 6:
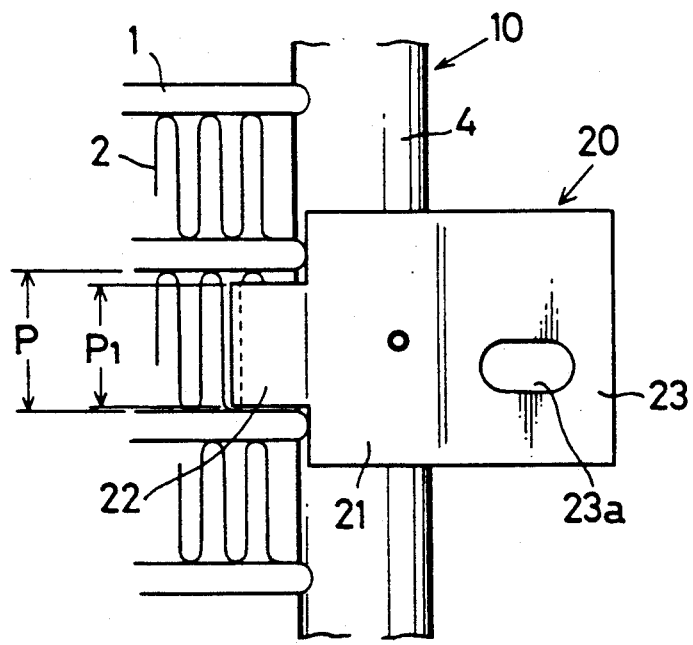
FIG. 6 is a front elevation view showing a further modified fastener which is attached to the heat exchanger body.

FIG. 6 illustrates a further modified fastener 20 whose hook end of the hooking portion 22 lacks the cutout, but which has other features similar to those in the embodiment described above. The hook end in this case is inserted between two adjacent tubes 1 and 1, and soldered to the heat exchanger body 10. The width $P_1$ of the hook end is preferably the same as or less than the distance "P" between two adjacent tubes by at most about 1.5 mm so that the modified fasteners can be tightly secured to the body 10, avoiding a loose-jointed connection. The same features as those in the already described embodiment are indicated by the same reference numerals and description thereof is omitted here.

Instead of bending one aluminum sheet, two or more aluminum pieces may be welded to form the fasteners in the embodiment. It is also possible to bend a belt-like aluminum sheet at its middle portion intermediate two longitudinal ends so as to form the concave portion and to subsequently bend both ends in opposite directions to form the hook end of the hooking portions. In this case, a separate fastening piece will be welded to the concave portion so as to protrude outwardly from it.

What is claimed is:

1. A heat exchanger including a heat exchanger body and fasteners attached to the body, the heat exchanger body comprising flat tubes and fin members alternatingly stacked one on another and a pair of hollow headers to which ends of each tube are connected in fluid communication, the fasteners each comprising a contacting concave portion with a shape which fits on the outer peripheral surface of a header of the heat exchanger body, a hooking portion protruding from an end of the concave portion and having a hook end at an extremity of the hooking portion, and a fastening portion extending outwardly from another end of the concave portion, wherein the contacting concave portion is placed in close contact with the peripheral surface of the header, with the hook end inserted in between two adjacent tubes so that the fasteners may be soldered to the heat exchanger body and become integral with it.

2. A heat exchanger as defined in claim 1, wherein the hook end of the hooking portion of each fastener is formed with a cutout extending from the tip of the hook end so as to engage with a tube.

3. A heat exchanger as defined in claim 1, wherein the width of the hook end of the hooking portion of each fastener is the same as or slightly less than a distance between adjacent tubes.

4. A heat exchanger as defined in claim 1, 2 or 3, wherein the hook end of the hooking portion of each fastener is inserted in between the adjacent tubes and spaced apart from the header.

5. A heat exchanger as defined in claim 1, wherein each fastener includes a lug protruding inwardly from the concave portion, and each header has a locking aperture perforated through a peripheral wall of the header so that the lug extends into the locking aperture.

6. A heat exchanger as defined in claim 1, wherein each header includes a lug protruding from a peripheral wall of the header and each fastener has a locking aperture perforated through its concave portion to receive the outwardly protruding lug.

7. A heat exchanger as defined in claim 1, wherein the hook end of the hooking portion is bent a 90° angle to the remaining hooking portion.

* * * * *